(12) United States Patent
Hamed

(10) Patent No.: US 10,562,590 B2
(45) Date of Patent: Feb. 18, 2020

(54) BICYCLE DERAILLEUR CHAIN DRIVER

(71) Applicant: Hazem Nihad Hamed, Huntington Beach, CA (US)

(72) Inventor: Hazem Nihad Hamed, Huntington Beach, CA (US)

( * ) Notice: Subject to any disclaimer, the term of this patent is extended or adjusted under 35 U.S.C. 154(b) by 0 days.

(21) Appl. No.: 16/374,638

(22) Filed: Apr. 3, 2019

(65) Prior Publication Data

US 2019/0256169 A1  Aug. 22, 2019

(51) Int. Cl.
*B62M 9/122* (2010.01)
*B62M 25/08* (2006.01)
*B62M 9/1242* (2010.01)

(52) U.S. Cl.
CPC ........... *B62M 9/122* (2013.01); *B62M 9/1242* (2013.01); *B62M 25/08* (2013.01)

(58) Field of Classification Search
CPC ...... B62M 9/122; B62M 9/123; B62M 9/124; B62M 9/132; B62M 9/133; B62M 9/134; B62M 9/1242; B62M 25/08
See application file for complete search history.

(56) References Cited

U.S. PATENT DOCUMENTS

| 6,047,230 | A | * | 4/2000 | Spencer | B62M 9/123 474/70 |
| 9,944,350 | B2 | * | 4/2018 | Braedt | B62M 9/122 |
| 2013/0054102 | A1 | * | 2/2013 | Cheng | B62M 25/08 701/55 |
| 2016/0039497 | A1 | * | 2/2016 | Mastracci | B62M 25/08 701/55 |
| 2016/0052594 | A1 | * | 2/2016 | Kimmich | B62M 9/122 701/22 |

* cited by examiner

*Primary Examiner* — Kevin Hurley
*Assistant Examiner* — Marlon A Arce

(57) ABSTRACT

A manually controlled chain driver apparatus for a bicycle drive chain derailleur providing necessary forward chain movement for derailleur operation less power transmission to bicycle pedals during stopping and coasting instances when pedaling motion has ceased or is not possible.

20 Claims, 14 Drawing Sheets

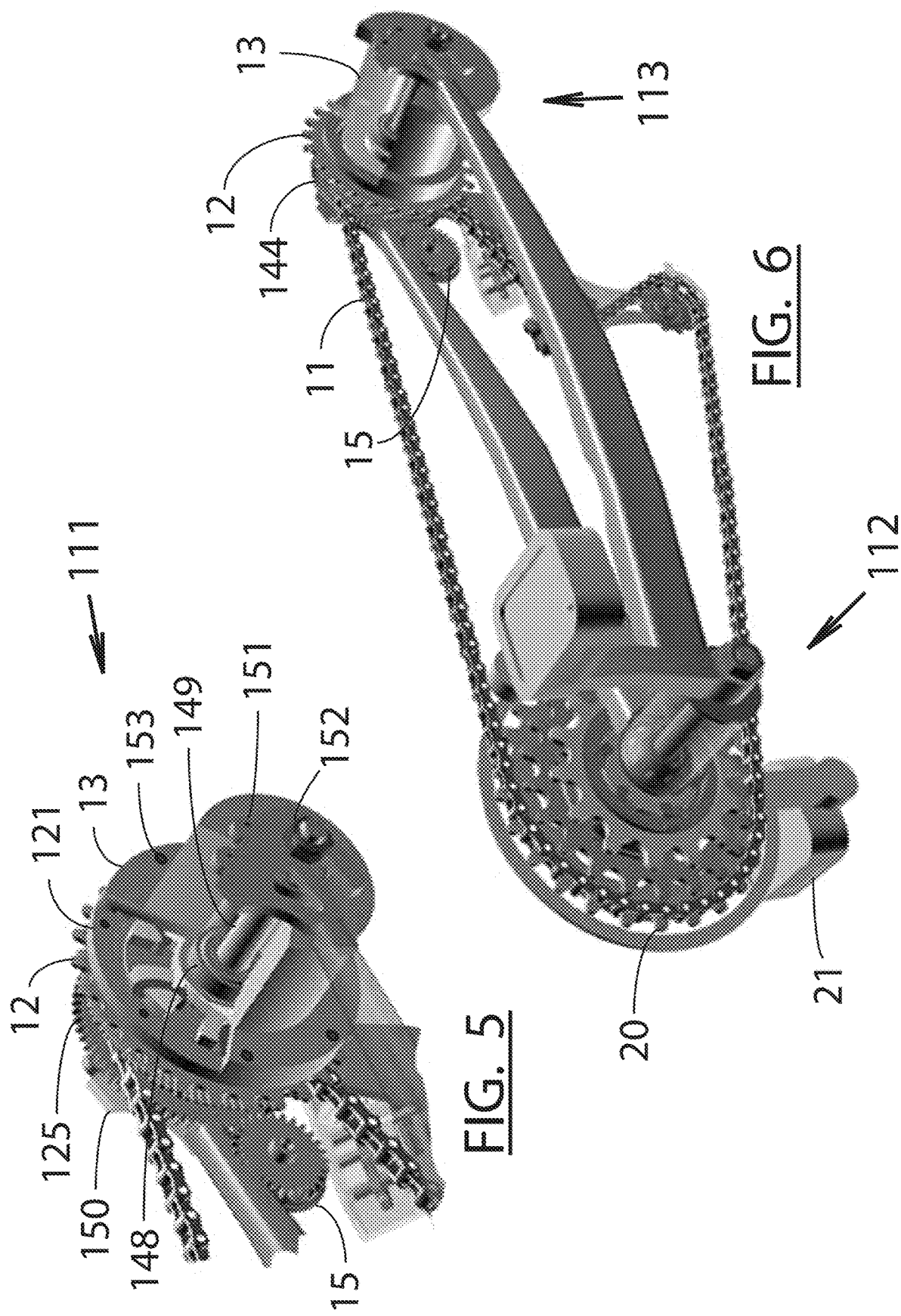

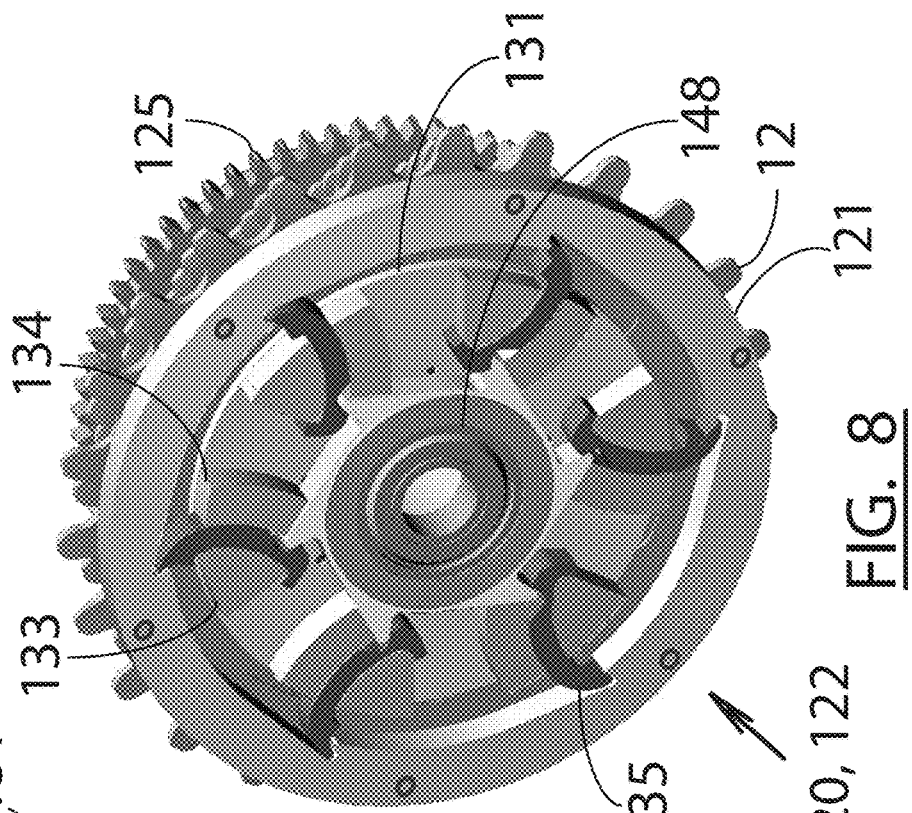
FIG. 8
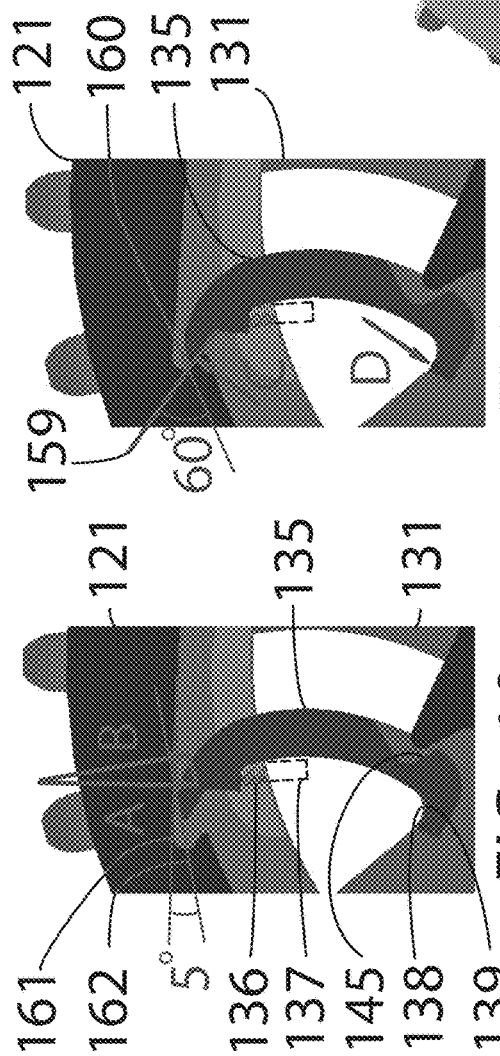
FIG. 9
FIG. 10
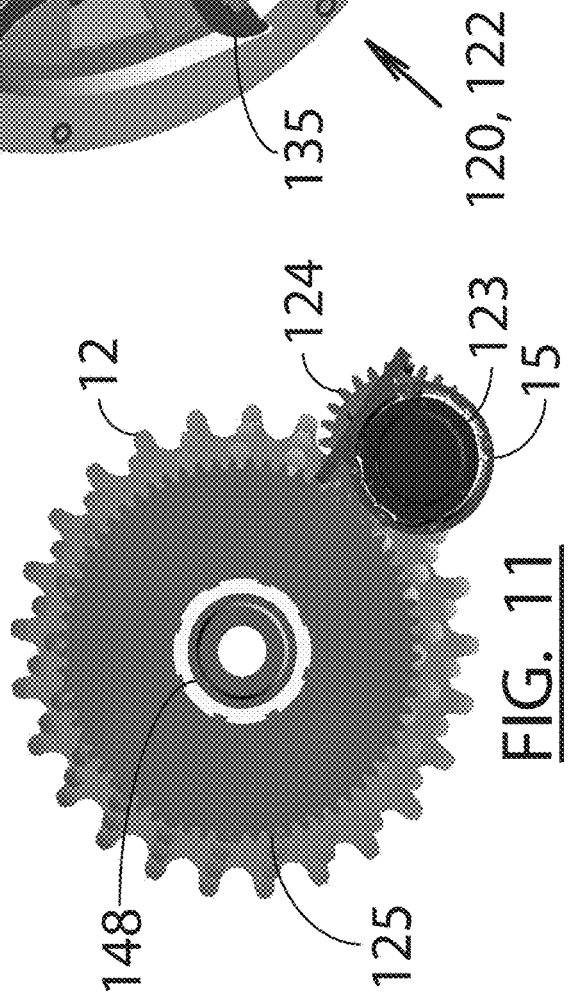
FIG. 11

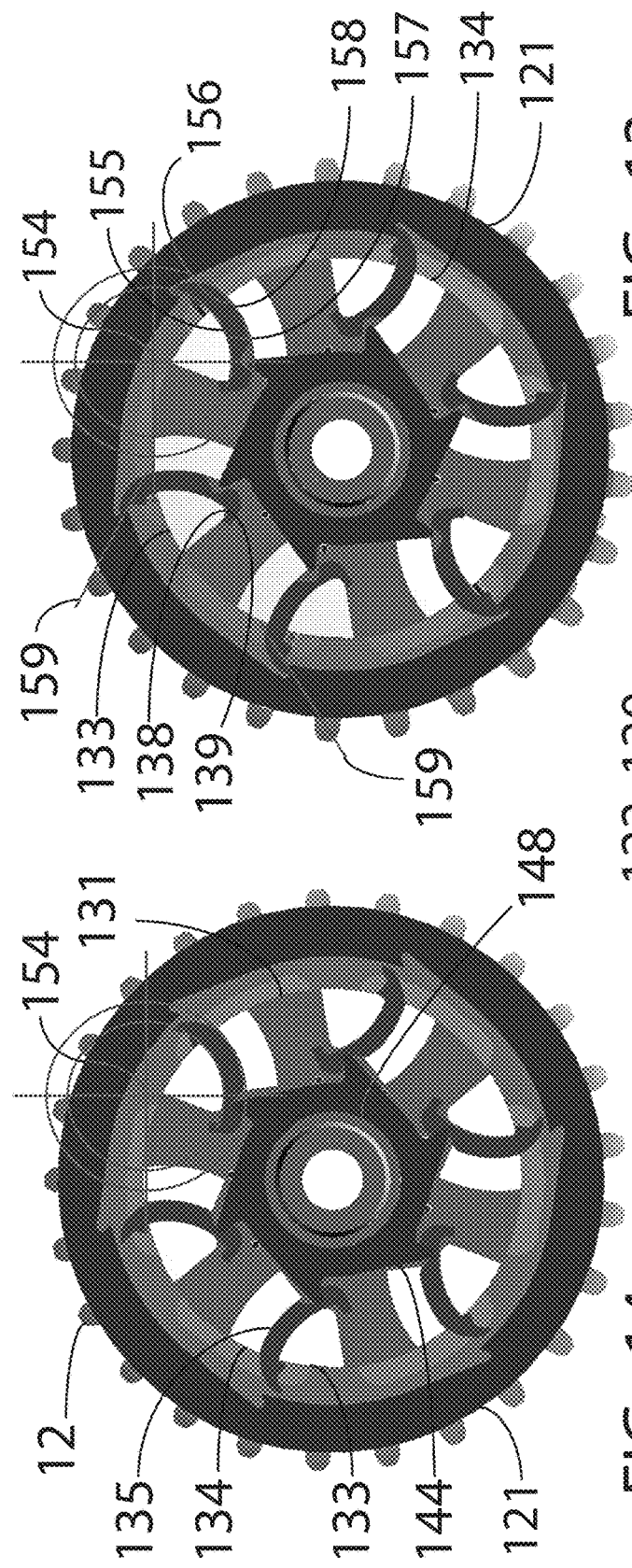
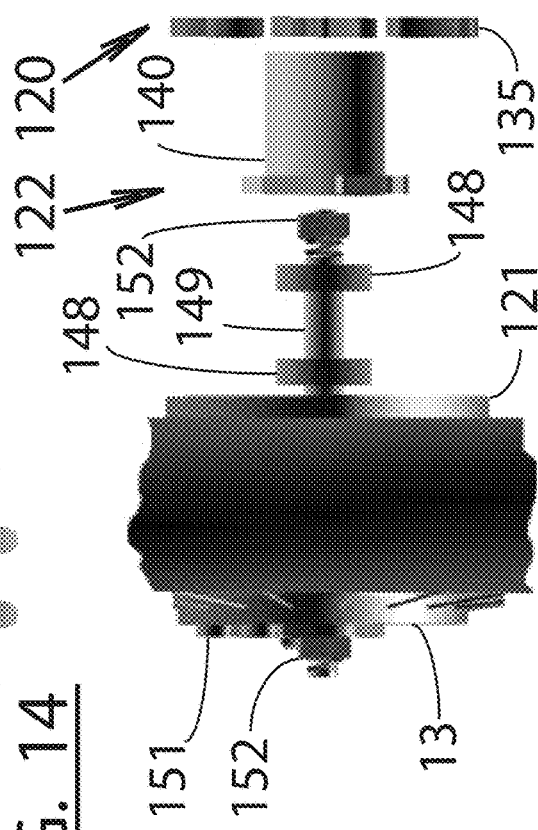
FIG. 13
FIG. 14
FIG. 12

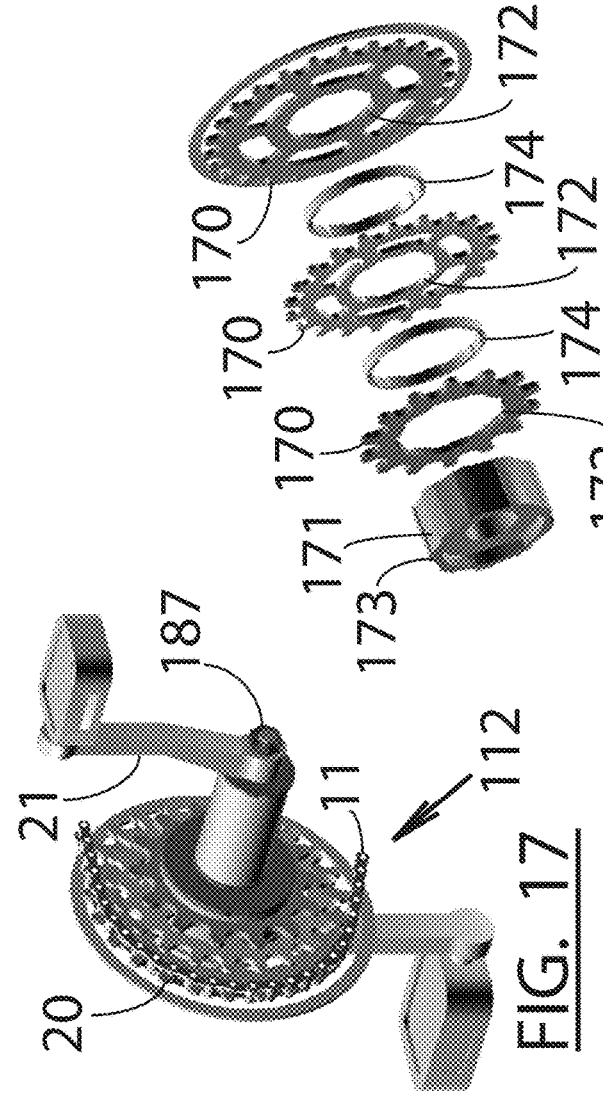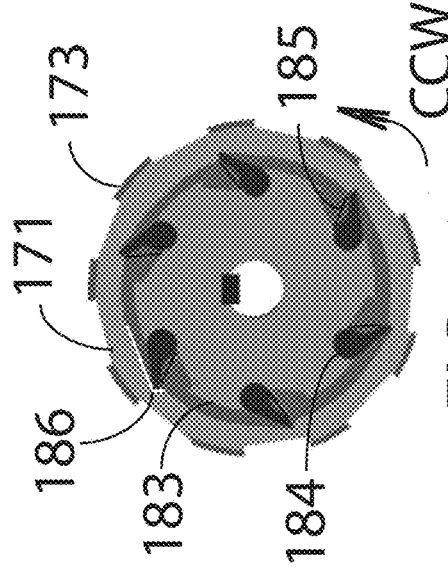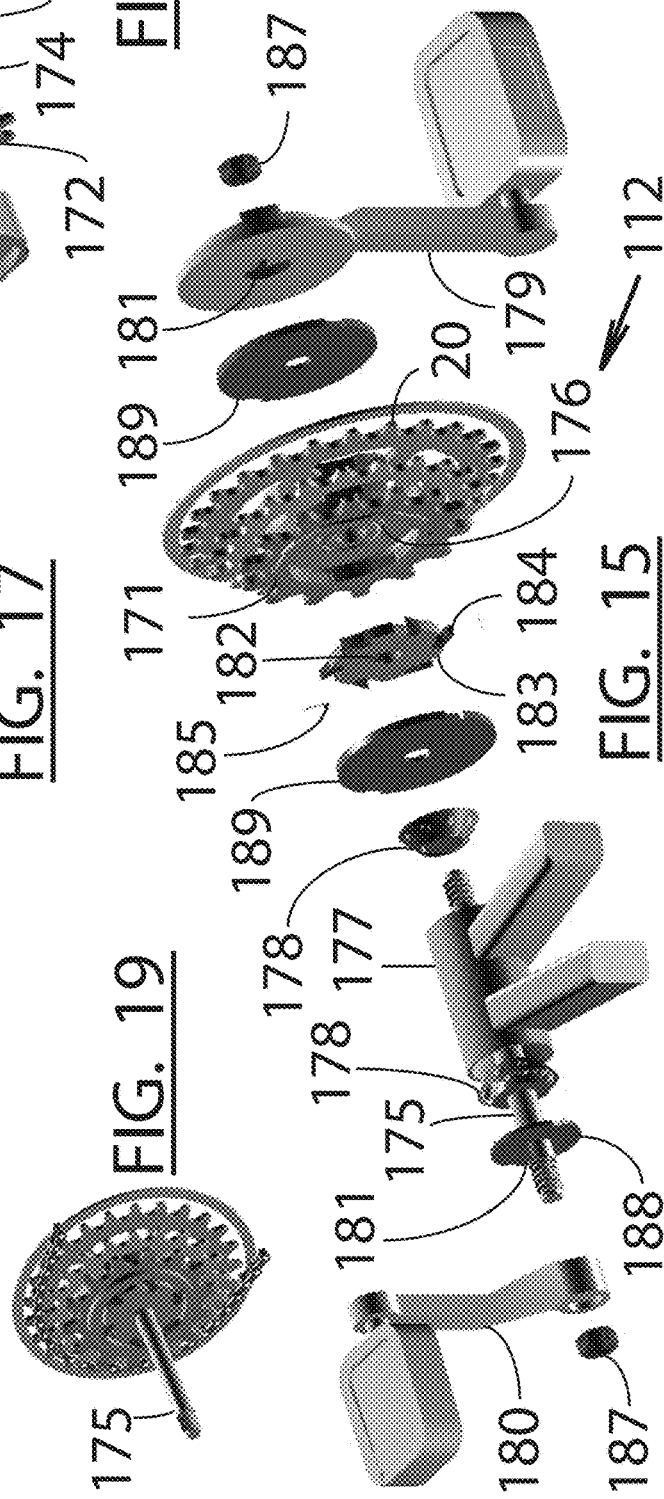
FIG. 15
FIG. 16
FIG. 17
FIG. 18
FIG. 19

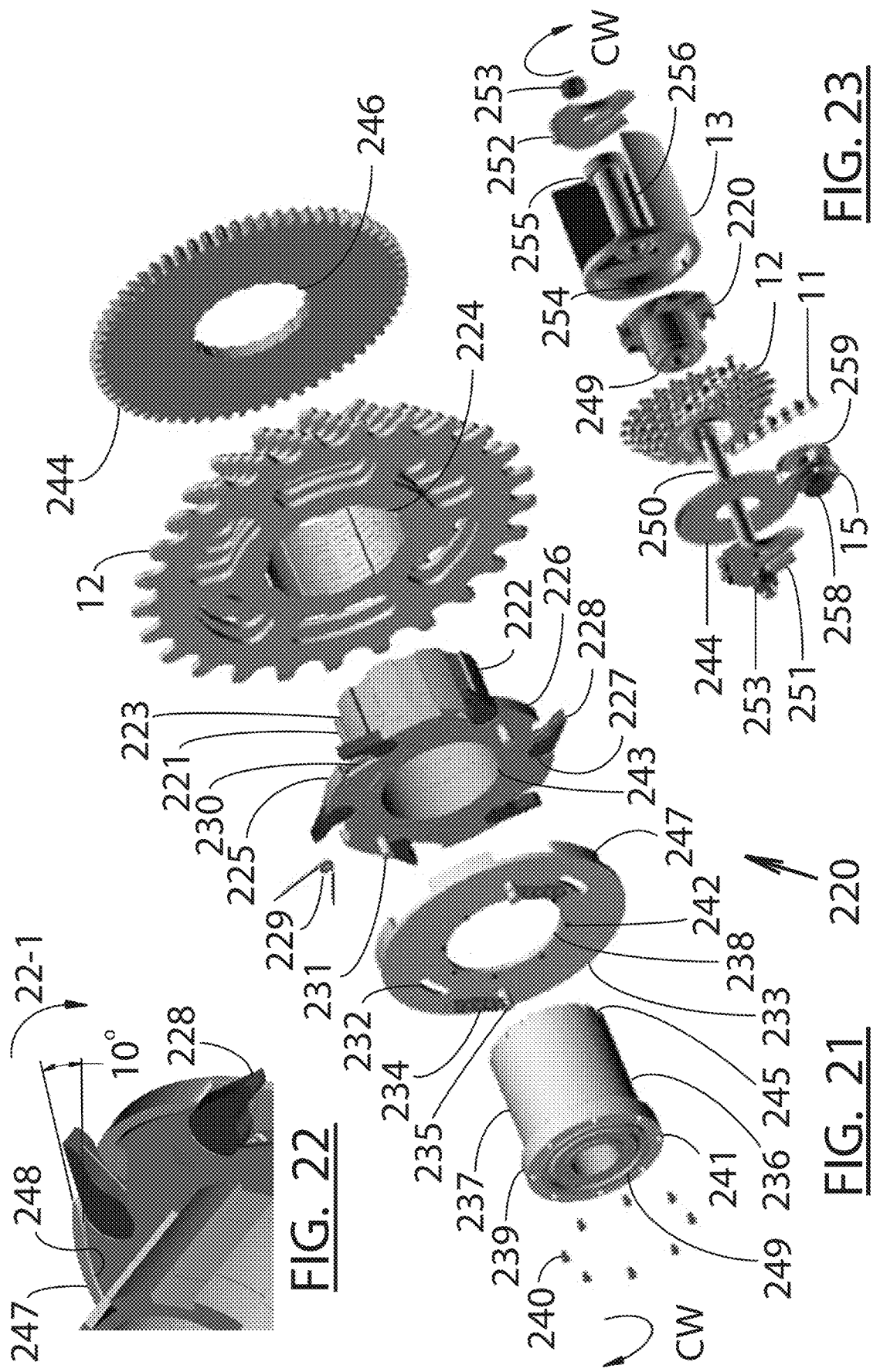

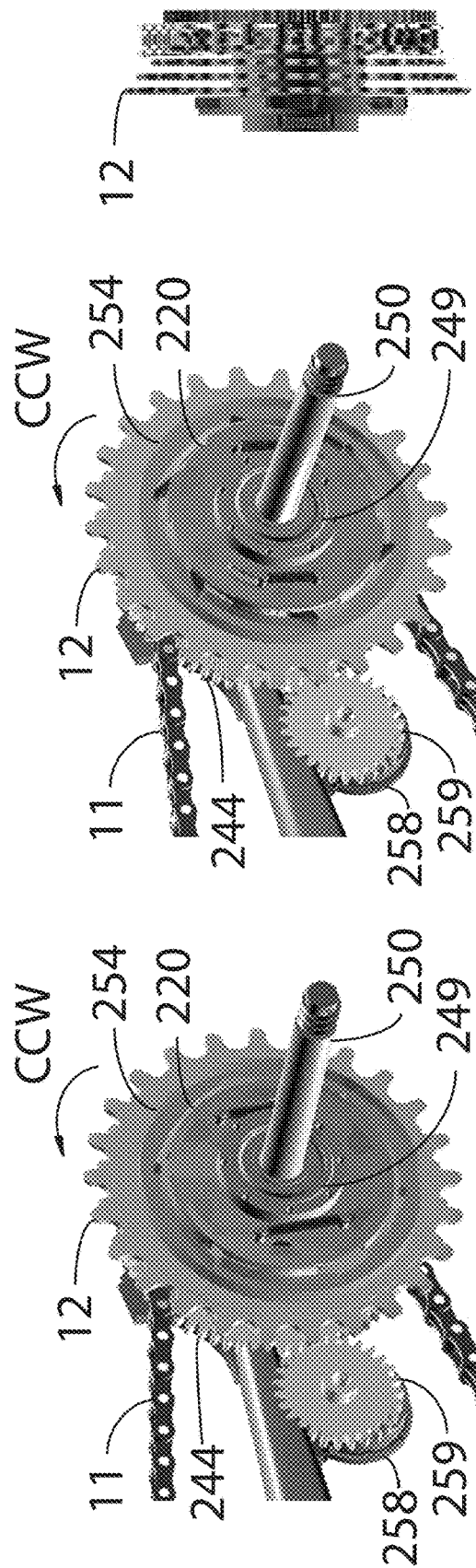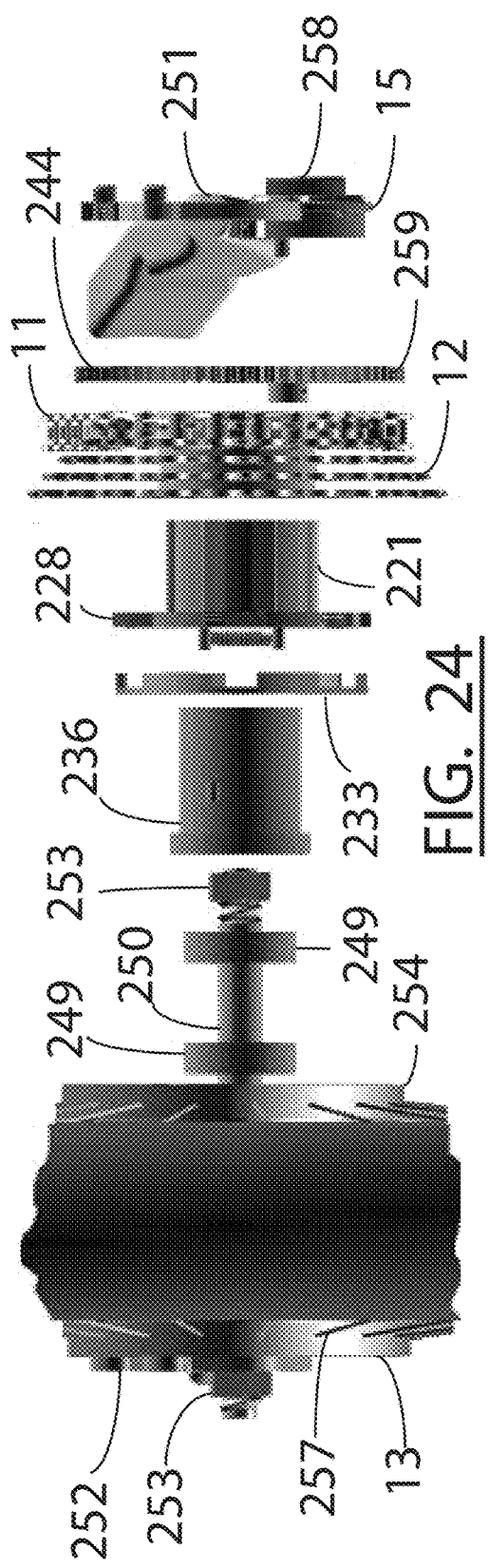

BICYCLE DERAILLEUR CHAIN DRIVER

CROSS-REFERENCE TO RELATED APPLICATIONS

Not Applicable

FEDERALLY SPONSORED RESEARCH

Not Applicable

SEQUENCE LISTING OR PROGRAM

Not Applicable

FIELD OF THE INVENTION

The disclosed invention relates to the cycling transportation and sporting industry, specifically to modern bicycle designs typically making use of front and rear drive chain derailleurs serving to alternate drive chain position between different ratio front and rear drive sprockets through linkage to a set of rider control levers permitting the rider to achieve an optimal drivetrain ratio through selection of an adequate combination of front and rear drive sprockets, thereby facilitating a comfortable pedaling rate and effort thereof depending on desired road speed, rider conditioning, road inclination and other circumstantial conditions.

BACKGROUND OF THE INVENTION

Bicycles have existed for many years throughout serving as transportation and sporting means. Over the great time span since their inception, the technology has evolved with numerous designs and advancements predominantly geared toward addressing rider comfort. With the initial designs from many years ago comprising a single speed power transmission mechanism often requiring the rider to either exert undue effort on the pedals or have to alternate the pedals at an uncomfortably high rate to achieve desired riding speed, a need was recognized for multiple powertrain ratios to facilitate acceptable operator pedaling rates and efforts. A variety of designs consequently evolved where additional power transmission drive sprockets of various number of teeth but equal pitch to the drive chain were added in the axial directions of the pedals mechanism as well as power transmission rear wheel hub to facilitate a combination of front and rear power transmission ratios resulting in optimal settings based on desired vehicle speeds, road conditions, operator biometrics and preference. This innovation was facilitated by the de-facto standard four bar linkage mechanism based derailleur assembly used to this very day to alternate drive sprockets through properly positioning the drive chain thereto as well as compensate for resultant varying chain lengths through an integral spring loaded chain tensioning mechanism. This capability was facilitated by two cable tensioning apparatuses, one for rear sprockets and another for the fronts. With one end of each cable apparatus connected to the derailleur chain positioning mechanism and the other end to an operator actuation mechanism typically comprising a lever assembly, this apparatus granted the operator the ability to alternate the chain position in the axial position for proper alignment and thereby engagement of selected rear and front drive sprockets in order to achieve optimal power transmission ratio settings. Advancements in the actuation mechanism included indexing capability of the operator lever assembly so that the actuation of the gearing mechanism takes place in an indexing fashion consistently properly aligning the chain with desired sprocket thereof rather than one continuous motion requiring the operator to guess the proper chain position often leading to positioning errors, inefficiency and premature chain wear.

On a most fundamental level, the de-facto chain derailleur design used to this very day requires chain movement in the forward direction in order to operate. Circumstances often arise where a bicycle shift is needed but chain motion is not available in situations such as during braking or coasting where the rider has ceased to operate the pedals, the derailleur is inevitably left in the wrong speed setting, or in other words with the derailleur engaged with the wrong sprocket. In the event where the rider has stopped, a restart in a high drive sprocket is often required leading to undue effort from the rider and poor ergonomics where the rider upon initiating motion, however difficult, expends a great deal of attention and effort alternating the shifter into a more ideal setting. Another type occurrence albeit less serious is when the rider is coasting downhill and has also ceased to operate the bicycle pedals, depending on the road condition, upon need to continue to pedal, the bicycle speed is invariantly in the wrong setting.

The inventor hereby discloses a novel improvement to the standard sprockets derailleurs based bicycle drivetrain by means of a chain driver apparatus providing on demand capability to the rider for energizing the bicycle drive chain in the forward direction through simple actuation of an electrical pushbutton enabling operation of the bicycle derailleurs to achieve desired setting, whether the bicycle is in motion or is in a complete stop, henceforth providing a more comfortable and ergonomic experience for the rider.

DISCUSSION OF PRIOR ART

The following is a brief summary of prior art deemed pertinent to the bicycle derailleur chain driver of the present invention.

U.S. Pat. No. 7,892,122 B2 and Reissue Pat. U.S. RE41,782 summarize a complex derailleur arrangement making use of a torsion spring to permit shifting less bicycle chain motion in what is seemingly an attempt to enable the rider to shift during a stop. This provision seems additionally intended to overcome the great constraint placed on this design by confining the derailleur motor along with reduction gearing to a small housing. As a shift operation less any chain motion sensors confirming shift action is possible, is likely to prove detrimental to the confined and prone to overheating motor, attempt has been made for the derailleur to reach intended position during shift notwithstanding lack of chain motion so that applied power would cease short of burning the small motor windings. It is noteworthy to indicate that this problem does not resolve the shortcoming of the legacy derailleur of not being able to shift less chain motion, this approach simply attempts to overcome the aforementioned challenge inherent to the legacy shifter design.

U.S. Pat. No. 6,997,835 B2 discloses an electrically powered bicycle rear derailleur with compliance means for storage of energy so that actuation thereof takes place as needed notwithstanding lack of necessary forward chain motion required by the legacy four bar linkage derailleur design in again what seems to be an attempt to alleviate potential motor overheating conditions due to lack of necessary forward chain motion necessary for the derailleur to reach intended position. The seek position of the shift motor is nevertheless achieved with compliance means storing the shifting energy. It is important to note that this does not solve the problem of the bicycle being in the wrong setting after stopping, therefore aside from minimizing chances of an overheated motor, this invention seems to be predominantly aimed at relieving the rider for the necessary shift task after stopping. Moreover, an unintended result of this provision is the lack of highly desirable accuracy of the position held by the derailleur since reaction by a mechanical spring is typically proportionate to displacement so that the derailleur final settling position, although typically close, is nevertheless never reached due spring hysteresis and offset by the encountered resistance by the chain and mechanical friction within the derailleur linkage.

Notwithstanding the long recognized need for alleviating the bicycle rider from the undue effort necessary for reinitiating bicycle motion after a sudden stop due to the bicycle drivetrain being in the wrong setting, an effective solution to this challenging problem has proven highly elusive. Lack of disclosed art along with lack of commercially successful and thereby available products providing shifting capability to the standard de-facto derailleur design during a complete stop is proof of lack of a novel solution to this challenging problem.

BRIEF SUMMARY OF THE INVENTION

Inventor discloses an improved bicycle powertrain design overcoming the shortcomings of the standard derailleur inability to shift while the bicycle is in a stationary state through addition of an auxiliary chain driver apparatus granting the rider the ability to execute the otherwise unavailable desired stand still shifting function.

The preferred embodiment of the bicycle derailleur chain driver of the present invention comprises a novel drive chain actuation apparatus making use of an electric motor serving to power the bicycle drive chain in the forward direction subsequent to actuation of a thereto connected rear hub pawl and ratchet disengagement mechanism serving to sever consequential power delivery to the rear hub of the bicycle. A roller clutch apparatus at the pedals assembly serves to sever power transfer thereto otherwise necessitated by resultant forward chain movement.

The invention includes a simplistic controls apparatus comprising two electrical switches placed on the right and left sides of the bicycle handlebars hard wired in parallel to enable the rider on demand power switching of the chain driver motor through an on board rechargeable battery pack. An optional auxiliary dynamo serves to provide trickle charge to the battery pack such that removal for recharge thereof is not necessary.

Alternate embodiments of the chain driver of the present invention are additionally presented. One making use of an alternate rear hub pawl and ratchet collapsing apparatus and another comprising an alternate pedals assembly construction making use of a pawl and ratchet assembly permitting higher power and pedals torque transfer to the bicycle rear hub assembly.

BRIEF DESCRIPTION OF THE DRAWINGS

FIG. 5 is a perspective cutaway view of the systems and components comprising the preferred embodiment of the chain driver of the present invention.

FIG. 6 is a perspective view of the systems and components comprising an alternate embodiment of the chain driver of the present invention.

FIG. 8 is a perspective view of the internal components comprising the preferred embodiment of the chain driver of the present invention.

FIG. 9 is a partial plan view of the preferred embodiment of the chain driver of the present invention depicting resultant force and reaction in engagement position.

FIG. 10 is a partial plan view of the preferred embodiment of the chain driver of the present invention depicting resultant force and desirable pawl collapse component in slip position.

FIG. 11 is a rear view depicting the chain driver motor and gearing of the preferred embodiment of the chain driver of the present invention.

FIG. 12 is an exploded side assembly view of the components comprising the preferred embodiment of the chain driver of the present invention.

FIG. 13 is a plan view of the preferred embodiment of the chain driver of the present invention with the pawl cam assembly in disengaged position.

FIG. 14 is a plan view of the preferred embodiment of the chain driver of the present invention with the pawl cam assembly in engaged position.

FIG. 15 is an exploded view of the pedals assembly of the preferred embodiment of the chain driver of the present invention.

FIG. 16 is an exploded view of the pedals sprockets assembly of the preferred embodiment of the chain driver of the present invention.

FIG. 17 is a perspective view of the pedals assembly of the preferred embodiment of the chain driver of the present invention.

FIG. 18 is a plan view of the pedals ratcheting assembly of the preferred embodiment of the chain driver of the present invention in engaged position.

FIG. 19 is perspective view depicting internal construction of the pedals assembly of the preferred embodiment of the chain driver of the present invention.

FIG. 21 is an exploded view of the components of the alternate embodiment of the chain driver of the present invention.

FIG. 22 is a partial perspective view depicting critical geometric feature of the pawl cam assembly of the alternate embodiment of the chain driver of the present invention.

FIG. 23 is an exploded view of the rear hub assembly of the alternate embodiment of the chain driver of the present invention.

FIG. 24 is an exploded side view of the components of the alternate embodiment of the chain driver of the present invention.

FIG. 25 is a partial end view of the alternate embodiment of the chain driver of the present invention.

FIG. 26 is a perspective view of the alternate embodiment of the chain driver of the present invention with the pawl ratchet assembly in engaged position.

FIG. 27 is a perspective view of the alternate embodiment of the chain driver of the present invention with the pawl ratchet assembly in disengaged position.

DETAILED DESCRIPTION OF THE INVENTION

Figure 1:
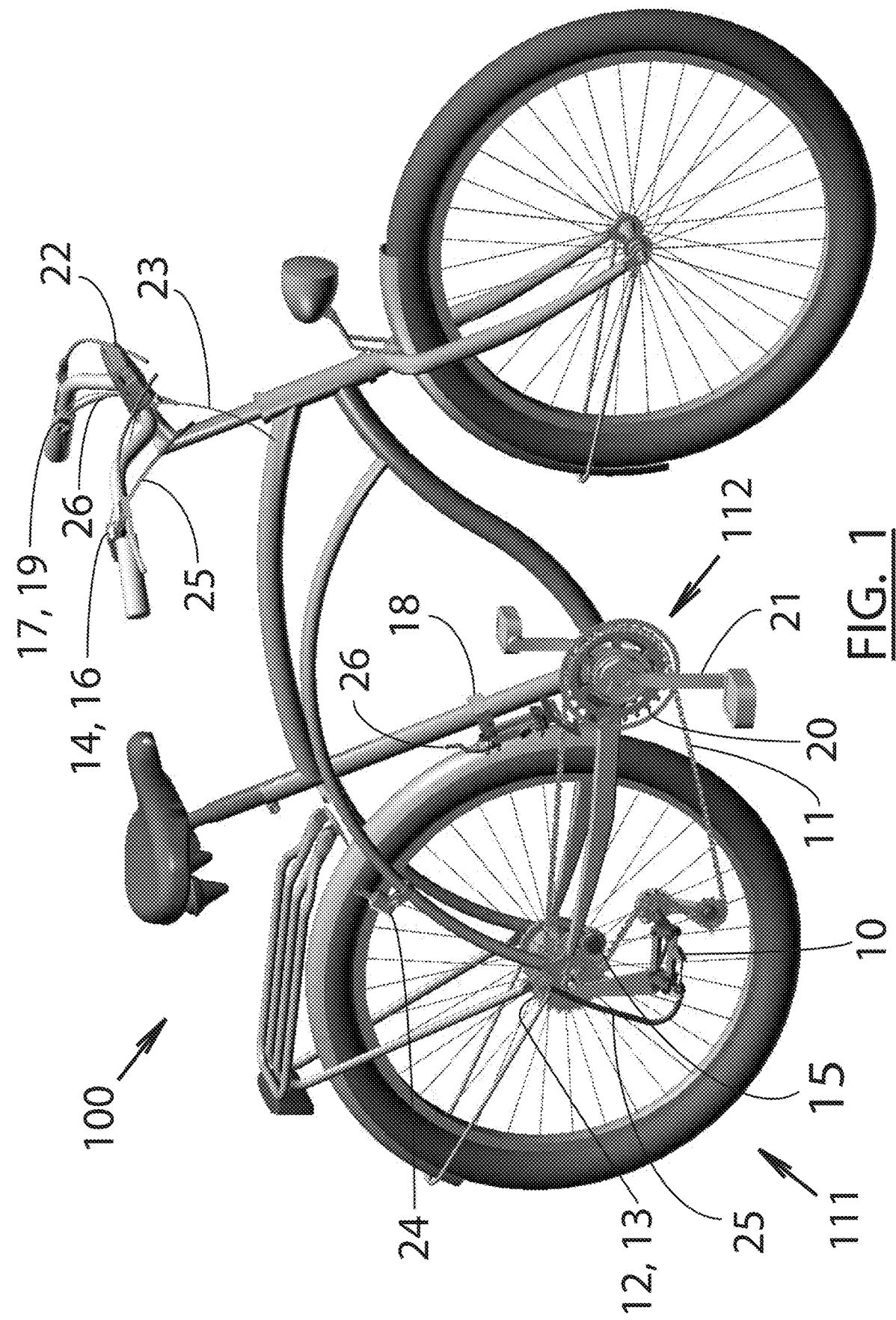
FIG. 1 is an overall perspective view of the systems and components of a bicycle with manual derailleurs making use of the preferred embodiment of the chain driver of the present invention.
Figure 2:
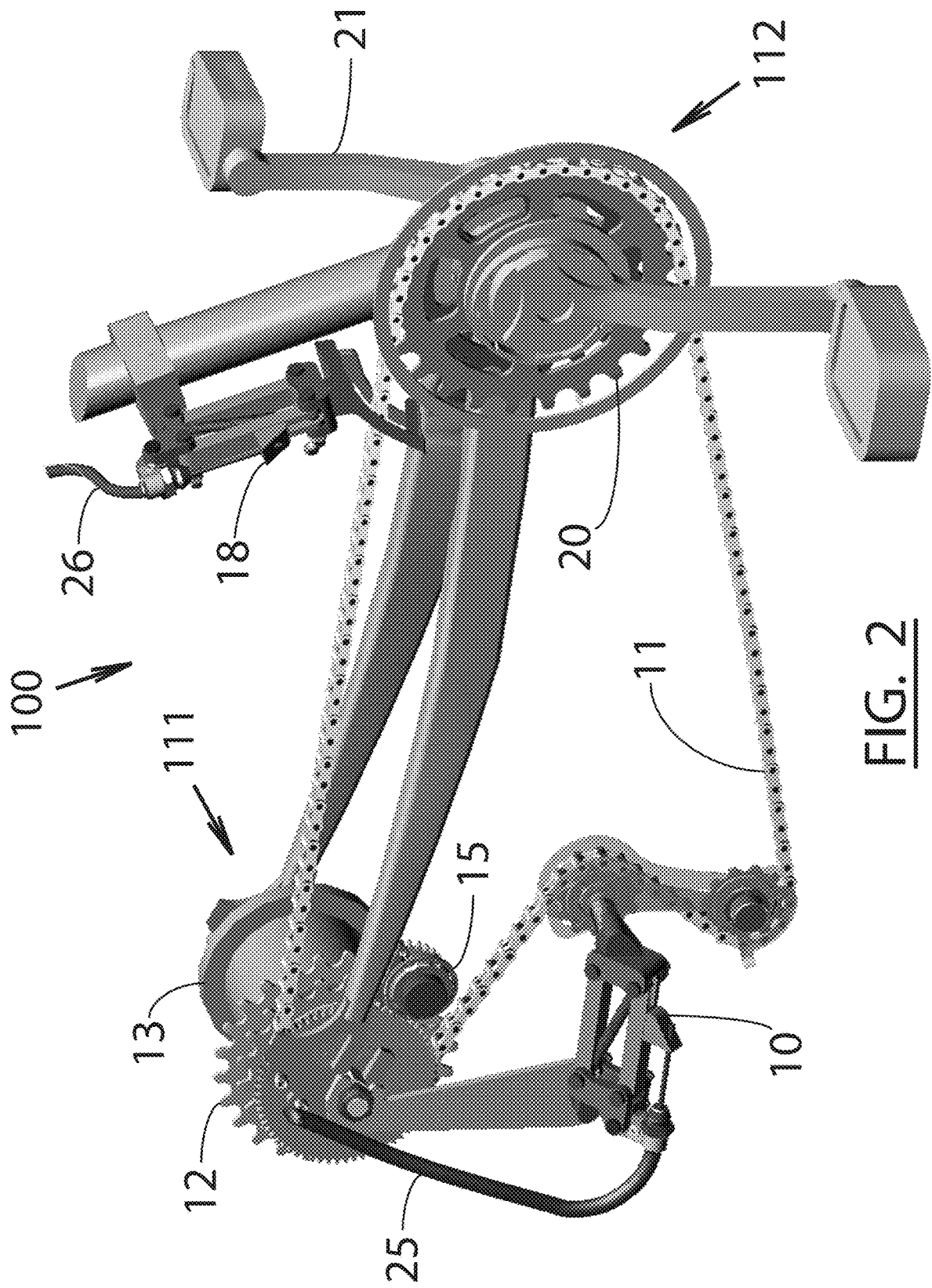
FIG. 2 is a perspective view of the powertrain of a bicycle with manual derailleurs making use of the preferred embodiment of the chain driver of the present invention.

Preferred Embodiment Construction—FIGS. 1-2.

With reference to FIGS. 1 & 2, arrangement 100 of a manual derailleur based bicycle making use of the preferred embodiment chain driver of the present invention comprises manual rear derailleur assembly 10 serving to alternate chain 11 between sprockets 12 of rear drive hub assembly 13 through right derailleur shifter 14 located on the bicycle right handlebar, chain driver motor 15 of chain driver apparatus 111 serving to energize chain 11 in the forward direction under rider command by right chain driver switch 16 located on the right handlebar and left chain driver switch 17 located on the left handlebar in instances of lack of chain motion thereof when shifting is desired, manual front derailleur assembly 18 actuated through front derailleur shifter 19 located on the left handlebar serving to alternate chain 11 between front sprockets assembly 20 of pedals ratchet apparatus 112 serving to sever power transmission to pedals assembly 21 upon actuation of chain driver motor 15, rechargeable battery pack 22 serving as powering means for chain driver motor 15, wiring harness 23 (partially shown) connecting right chain driver switch 16, left chain driver switch 17, chain driver motor 15, rechargeable battery pack 22 and optional dynamo 24 serving as power replenishment means for battery pack 22. Also depicted in the figures are rear derailleur cable 25 serving to actuate rear derailleur 10 upon rider triggering right handlebars derailleur shifter 14, and front derailleur cable 26 serving to actuate front derailleur 18 upon rider triggering left handlebar derailleur shifter 19.

Figure 3A:
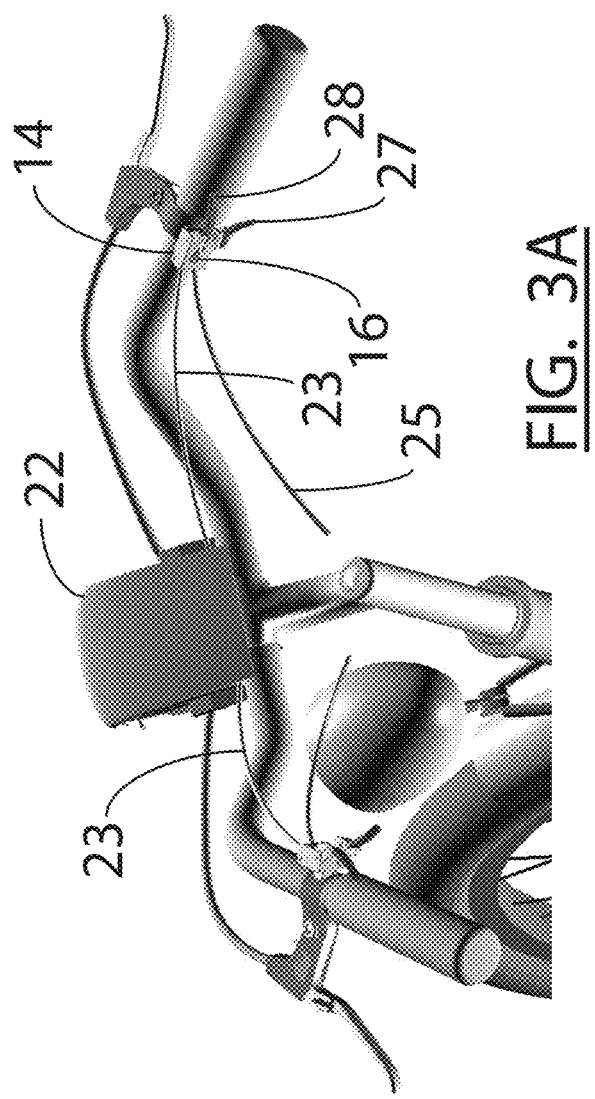
FIG. 3A is a perspective view of the rider handlebars with thereto located manual shifters, actuation switches and battery pack powering the preferred and alternate embodiments of the chain driver of the present invention.
Figure 3B:
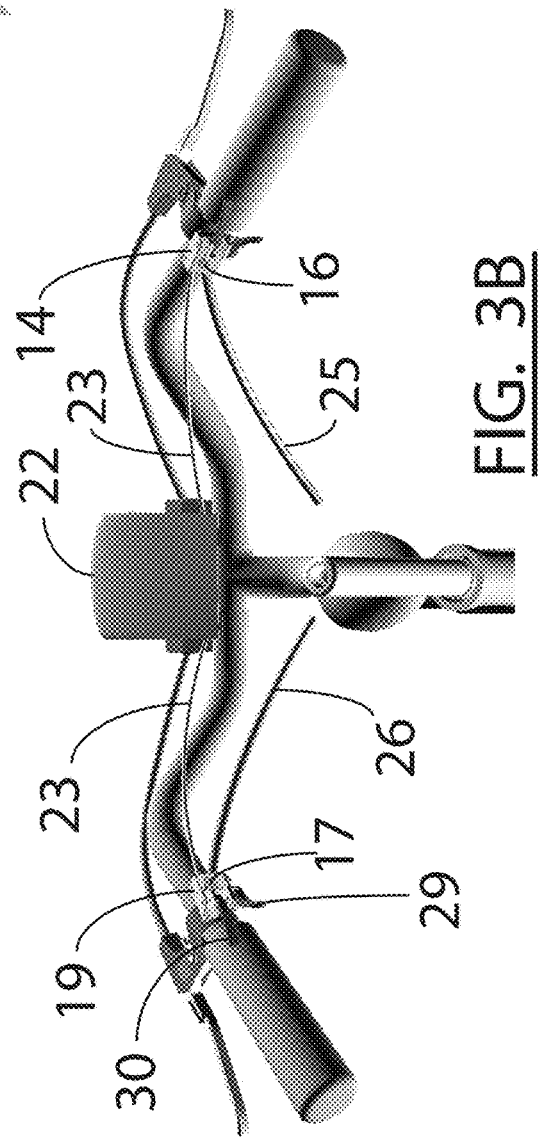
FIG. 3B is a top view of the rider handlebars with thereto located manual shifters, actuation switches and battery pack powering the preferred and alternate embodiments of the chain driver of the present invention
Figure 3C:
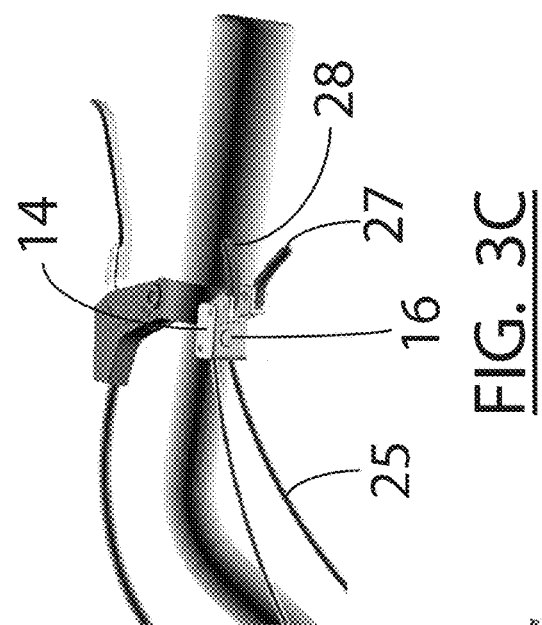
FIG. 3C is a closeup view of the rider right handlebar with thereto located manual shifters and chain driver actuation switch of the preferred and alternate embodiments of the chain driver of the present invention

Preferred and Alternate Embodiment Chain Rider Controls—FIGS. 3A-3C.

With reference to FIGS. 3A-3C, user handlebar controls of a manual derailleur based bicycle making use of the preferred embodiment chain driver of the present invention comprise manual rear derailleur shifter 14 with shift up lever 27 and shift down lever 28, manual front derailleur shifter 19 with shift up lever 29 and shift down lever 30, chain driver pushbutton 17 located on the left handlebar enabling the rider to actuate chain driver motor 15 for subsequent operation of rear derailleur 10 through actuation of derailleur shifter shift up lever 27 or shift down lever 28 of derailleur shifter 14, and chain driver pushbutton 16 located on the right handlebar enabling the rider to actuate chain driver motor 15 for subsequent operation of front derailleur 18 through actuation of derailleur shifter shift up lever 29 or shift down lever 30 of derailleur shifter 19. Given that chain driver motor actuation pushbuttons 16 and 17 are wired in parallel and therefore actuation is possible through trigger of either button, placement on both bicycle handlebars enables the user a two hand operation to shift either derailleur where chain driver actuation is necessary thereby alleviating the need for the rider to press a chain actuation motor pushbutton along with operating the shifter with one hand which could prove difficult.

Also depicted in FIGS. 3A-3C is battery pack 22 arbitrarily located in the center of the handlebars, a portion of wiring harness 23 connecting right chain driver pushbutton 16, left chain driver pushbutton 17 to battery pack 22, rear derailleur shifting cable 25 and front derailleur shifting cable 26.

Figure 4:
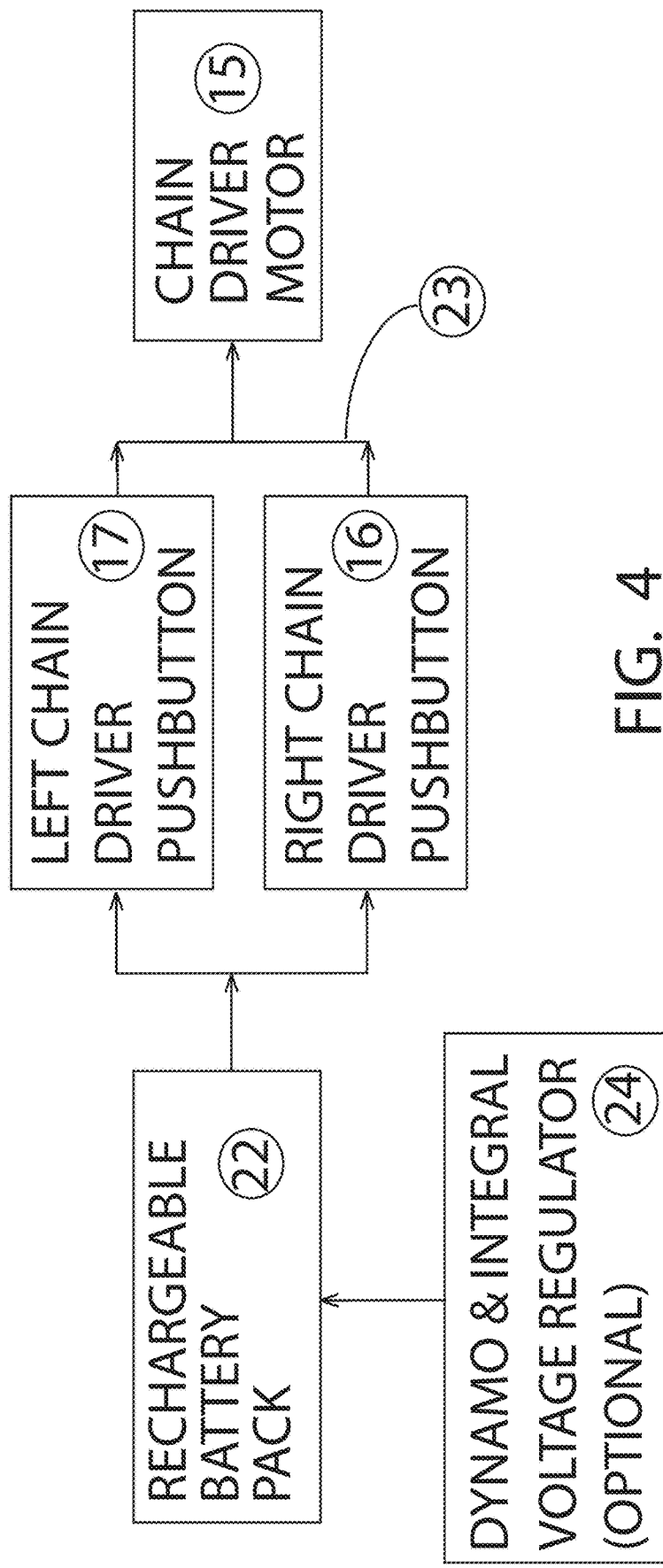
FIG. 4 is a block diagram of the control system and components of the preferred and alternate embodiments of the chain driver of the present invention.
Figure 7:
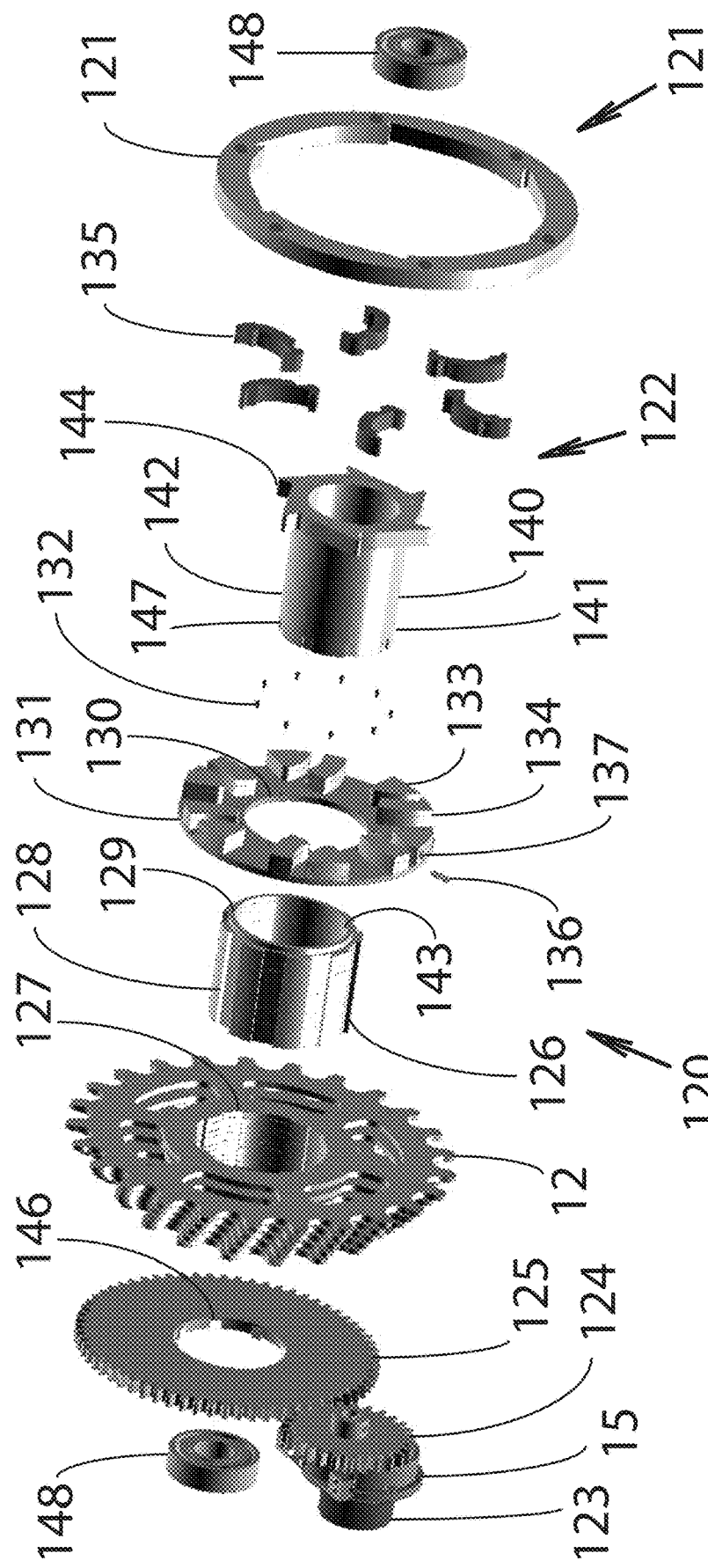
FIG. 7 is an exploded view of the systems and components comprising the preferred embodiment of the chain driver of the present invention.

Preferred and Alternate Embodiment Chain Driver Controls Block Diagram—FIG. 4.

With reference to FIG. 4, power to the preferred and alternate embodiments chain driver motor 15 of the present invention is supplied by rechargeable battery pack 22 through actuation of either right chain driver pushbutton 16 or left chain driver pushbutton 17 wired in parallel. Replenishment of expended power thereof is optionally provided by dynamo 24 depicted including necessary voltage regulation module in FIG. 4.

Preferred Embodiment Chain Driver—FIGS. 5, 7-19

With Reference to FIGS. 5, 7-19, the preferred embodiment chain driver 111 of the present invention serves to initiate chain motion in the forward direction as required for shifting action upon lack of chain motion thereof due to the rider ceasing to alternate the pedals during instances of coasting or braking with resultant reduction in speed requiring down shifting action by the chain derailleurs or in instances of inadvertent increase in speed such as during downhill descent requiring up shifting action. This controls philosophy inherently requires decoupling of the rider pedals in order to permit necessary free chain motion less power transmission thereto. With Reference to FIGS. 15-19, pedals ratchet mechanism 112 of the preferred embodiment chain driver of the present invention serves to permit energization of chain 11 for power transmission to rear sprockets assembly 12 upon actuation of pedals assembly 21 in the forward direction and the necessary slip action upon chain driver 111 energizing the chain in the forward direction while pedals 21 are in a stationary or reverse operation state in order to prevent power transmission thereto.

With reference to FIGS. 5, 7-19 again, the preferred embodiment chain driver 111 of the present invention makes use of actuation of pawl assembly 120 by thereto rotatably captive sprockets assembly 12, upon forward motion of chain 11 due to forward actuation of pedals assembly 21, resulting in engagement of rear hub ratchet 121 and thereto attached bicycle rear hub 13 resulting in bicycle forward motion, and additionally makes use pawl cam assembly 122 actuated by chain driver motor 15 with or without optional roller clutch 123 connection to pinion 124 and gear 125 forcing collapse of pawl hub assembly 120 and thereby severance of connection to rear hub ratchet 121 and thereto attached bicycle rear hub 13 with subsequent rotation of pawl cam assembly 122 forcing rotation of pawl assembly 120 and thereto captive rear sprockets assembly 12 resulting in forward motion of chain 11 lest power transmission to bicycle pedals due to pedals ratchet mechanism 112 facilitating slip at front sprockets assembly 20 thereby permitting derailleurs 10 and 18 to alternate sprockets while the bicycle pedals are in a stationary state.

With reference to FIGS. 7-14, the preferred embodiment of the chain driver 111 of the present invention comprises pawl assembly 120 including pawl cylinder 126 rotationally secured at one end to rear sprockets assembly 12 through inside diameter splines 127 and accurately fitting outside diameter splines 128 thereof with opposite end pilot diameter extension 129 accurately fitting inside diameter 130 of pawl hub 131 secured thereto by a plurality of screws 132 extending through clearance holes in pawl hub 131 and are fastened into a matching plurality of tapped holes in pawl cylinder 126 thereby forming one assembly with a plurality of axial extensions 133 and 134 serving to radially retain a matching plurality of pawls 135 urged in the outer radial direction by a matching plurality of compression springs 136 retained in radially oriented cavities 137 in axial extensions 133 of pawl hub 131 with cylindrical surfaces 138 of pawl hub extensions 133 limiting outward radial travel of pawls 135 through contact with mating surfaces 139 thereof. Pawl cam assembly 122 includes cam hub 140 comprising axial extension 141 with outside diameter 142 accurately slip fit to inside diameter 143 of pawl cylinder 126, and a plurality of radially extended cams 144 serving to retract pawls 135 in inward radial direction through contact with mating cylindrical relief features 145 upon relative rotation thereof under the action of chain driver motor 15 acting through pinion 124 transmitting motion through gear 125 rotationally retained to cam hub 140 by means of internal diameter splines 146 and mating outside diameter splines 147 of pawl hub 140. With reference to FIGS. 7, 8, 11 & 12, bearings 148 accurately fit into counterbores in opposite ends of cam hub 140 provide necessary radial support and rotation antifriction means for pawl cam assembly 122, thereto radially supported accurately fit to outside diameter pawl hub assembly 120 along with thereto retained rear sprockets assembly 12, about rear axle shaft 149 extending between bicycle frame rear right clevis 150 and left clevis 151 and secured at both ends by locknuts 152.

With reference to FIG. 5, ratchet 121 is attached to rear hub 13 my means of a plurality of screws 153 protruding through clearance holes in flange of rear hub 13 and are anchored into a matching plurality of tapped holes in ratchet 121. Rear hub assembly 13, attached to rear wheel by a plurality of spokes (not shown in FIG. 5), is rotationally operable about shaft 149 and is rotationally secured thereto by a duplex set of bearings 148 adjacent to nesting pawl hub assembly 120 and thereto nested pawl cam assembly 122 also rotationally operable about shaft 149 through other aforementioned duplex set of bearings 148, all thereby forming one integral bicycle rear drive assembly supported by shaft 149 between right bicycle clevis 150 and left bicycle clevis 151 and secured thereto by means of locknuts 152.

With additional reference to FIGS. 13 & 14, withdrawal of pawls 135 under the action of cams 144 is facilitated through pure rotation action about respective centers 154 of pawls 135 concentric cylindrical profiles 155 and 156 retained between matching cylindrical profiles 157 of pawl hub extension 133 and matching cylindrical profile 158 of pawl hub extension 134 respectively.

With reference to FIG. 9 depicting engagement of pawl 135 to ratchet 121 upon actuation of rear sprockets assembly 12, a fundamental requirement of this arrangement is the angle formed between line of action 159 and tangent 160 at point of engagement of pawl 135 and ratchet 121 being on the order of 60 to 80 degrees in order to ensure that reaction force "C" serves to draw pawl 135 in the outward radial direction with axial extension 133 of pawl hub 131 providing reaction "D" necessary for stable equilibrium, permitting actuation thereof.

With reference to FIG. 10 depicting slip action between pawl 135 and ratchet 121 under conditions where the rear wheel is in motion with the rear sprockets assembly 12 in a predominantly stationary state, angle between line of action 161 between ratchet 121 and pawl 135 and tangent 162 at point of engagement ideally falls within the 5 to 10 degree range in order to result in acceptable force component "B" along direction of inward radial translation of pawl 135 due to resultant reaction force "A", thereby facilitating reliable slip action thereof.

Preferred Embodiment Pedals Ratchet Mechanism—FIGS. 15-19.

With reference to FIGS. 15-19, the preferred embodiment of the pedals ratchet mechanism 112 of the preferred embodiment chain driver of the present invention comprises front sprockets assembly 20, including a plurality of sprockets 170 of different ratios rotationally retained to ratchet hub 171 through sprocket internal splines 172 and matching ratchet hub external splines 173 and separated by spacers 174, and is radially retained to pedals driveshaft 175 by a duplex set of bearings 176 disposed in counterbores in opposite ends of ratchet hub 171. With reference to FIG. 15, pedals driveshaft 175 is radially retained to bicycle frame yoke 177 through angular contact bearings 178 and is rotationally keyed to right pedal 179 and left pedal 180 by means of keys 181 and is additionally rotationally retained by key 182 to pawl hub 183 radially retaining a plurality of pawls 184 rotatably operable about respective centers and spring loaded in the outward radial direction by a matching plurality of springs 185.

With reference to FIG. 18, pawl hub 183 is centrally located and internal to ratchet hub 171 with plurality of pawls 184 urged in the outward radial direction by said springs 185 to ensure engagement with matching plurality of pockets 186 (depicted in highlight) of ratchet hub 171 thereby forcing engagement thereof upon rotation of pawl hub 183 in the counterclockwise (FIG. 18—CCW) direction and thereby ability to drive ratchet hub 171 in the counterclockwise direction upon actuation of pawl hub 183 by thereto keyed pedals 179 and 180 in the forward direction. Profile of pockets 186 additionally provides for the necessary slip action upon rotation of ratchet hub 171 in the counterclockwise direction with respect to pawl hub 183 thereby the ability of ratchet hub 171 to slip past pawl hub 183 and thereto rotationally retained pedals 179 and 180, under forward rotation of sprockets assembly 20 due to forward motion of chain 11 upon actuation of preferred embodiment chain driver 111 of the present invention.

As depicted in FIGS. 15, 17 & 19, pedals driveshaft 175 is secured in the axial direction by locknuts 187 serving to axially retain pedal 180 to spacer 188 to angular contact bearing 178 to bicycle frame yoke 177 on the left hand side and right pedal 179 against spacers 189 serving to axially retain pawl hub 183 and ratchet hub 171 as one integral ratcheting assembly retaining angular contact bearing 178 to bicycle frame yoke 177 on the right hand side. Actuation of the bicycle pedals 179 and 180 in the forward direction results in rotation of thereto keyed pedals driveshaft 175 in turn forcing rotation of thereto keyed pawl hub 183 forcing radially outward spring loaded pawls 184 to engage ratchet hub 171 forcing rotation thereof and that of thereto retained sprockets 170 resulting in forward motion of chain 11 and power transmission to rear sprockets assembly 12. Conversely, forward movement of chain 11 while pedals 179 & 180 are in a stationary state results in rotation of sprockets 170 and thereto rotationally retained ratchet hub 171 causing slip over stationary pawl hub 183 keyed to stationary pedals driveshaft 175 and thereby facilitating free forward motion of chain 11 less power transmission thereof.

With reference to FIG. 17, pedals assembly 21 is depicted as an integral assembly comprising front sprockets assembly 20 and internal pedals ratchet mechanism 112 with partial view FIG. 19 depicting partial internal construction thereof.

Figure 20:
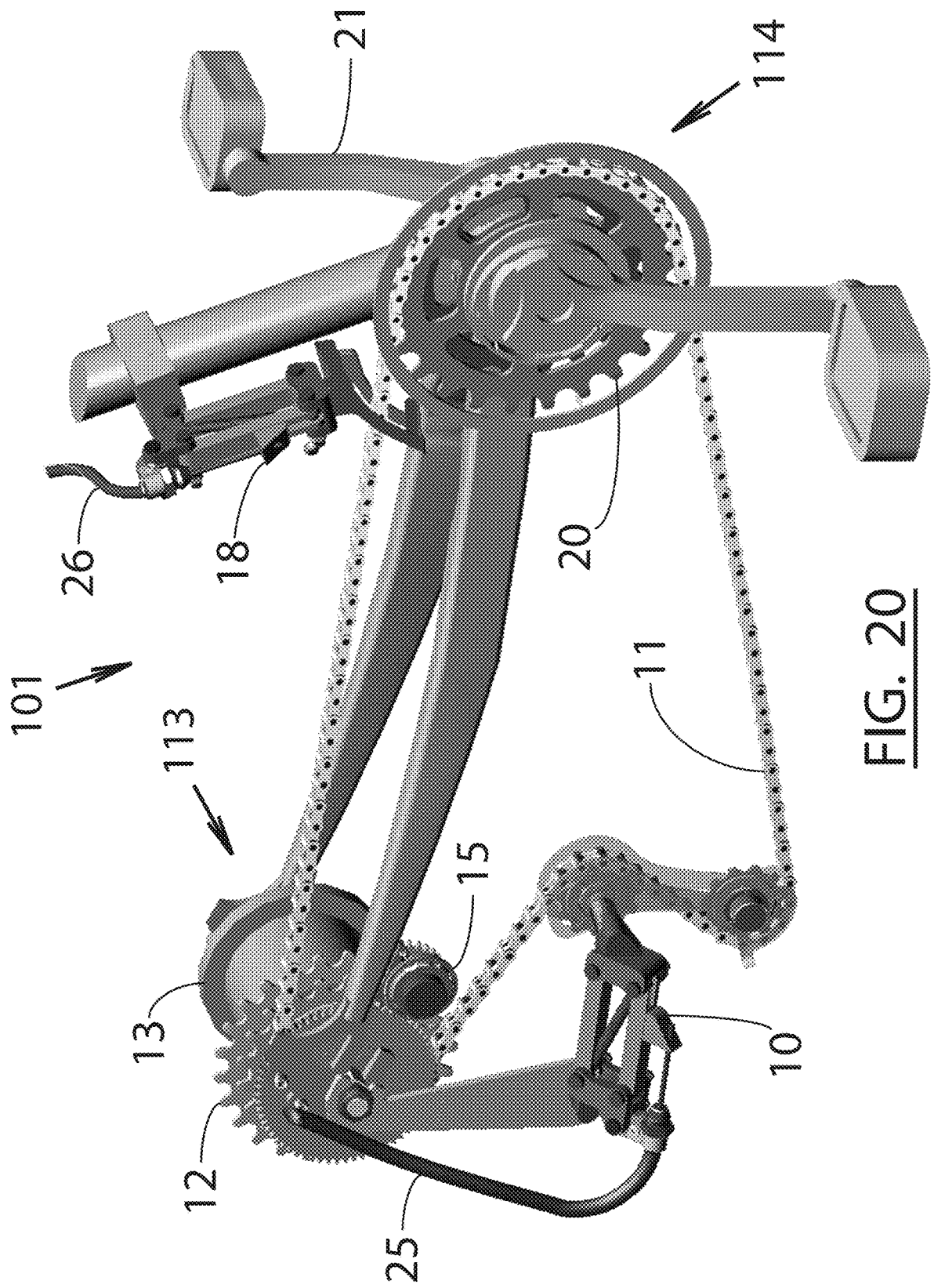
FIG. 20 is a perspective view of the powertrain of the alternate embodiment of the chain driver of the present invention.

Alternate Embodiment Chain Driver Powertrain—FIG. 20.

With reference to FIG. 20, arrangement 101 of a manual derailleur based bicycle powertrain comprises rear hub assembly 13 actuated by rear sprockets assembly 12 through forward motion of chain 11 upon actuation of front sprockets assembly 20 by pedals 21, alternate embodiment chain driver 113 providing on-demand forward motion of chain 11 through actuation of chain driver motor 15, pedals assembly 21 comprising pedals clutching mechanism 114 providing slip at front sprockets assembly 20 in order to prevent power transmission thereto upon actuation of chain driver 113, rear derailleur 10, front derailleur 18, along with all aforementioned controls components (Not shown in FIG. 20) necessary for operation of manual derailleur based bicycle powertrain arrangement 101.

Alternate Embodiment Chain Driver Construction—FIGS. 21-27.

With reference to FIGS. 21-27, alternate embodiment chain driver 113 of the present invention includes pawl ratchet assembly 220 comprising pawl hub 221 with axially protruding portion 222 provided with splined features 223 serving to rotatably capture rear sprockets assembly 12 through accurately fitting mating splines 224 and a plurality of radially projecting portions 225 provided with an accurately profiled outer cylindrical periphery 226 and including a matching plurality of cylindrical features 227 serving to radially retain a matching plurality of pawls 228 while permitting individual pivoting motion about respective centers thereof with each individually biased in the outer radial direction by a matching plurality of torsion springs 229 retained in a matching plurality of cavities 230 in axially projecting portions 225 of pawl hub 221. A plurality of pins 231 press fit into radially projecting portions 225 of pawl hub 221 protrude through a plurality of slots 232 of pawl collapsing cup 233 and acting through a matching plurality of springs 234 with opposite ends retained by a matching plurality of pins 235 press fit into pawl collapsing cup 233 thereof serve to bias pawl collapsing cup 233 in the clockwise (FIG. 21—CW) direction. Cam hub 236 with outside diameter 237 slip fit through inside diameter 238 of pawl collapsing cup 233 and including axially projecting portion 239 serve to secure pawl collapsing cup 233 against inside shoulder thereof by means of a plurality of screws 240 acting through holes 241 of cam hub 236 and tightly anchored into tapped holes 242 of pawl collapsing cup 233. Outside diameter 237 of cam hub 236 is slip fit through inside diameter 243 of pawl hub 221 and protrude through opposite end thereof to receive gear 244 rotationally affixed thereto through splines 245 of cam hub 236 and matching splines 246 thereof. Pawl collapsing cup 233 includes a plurality of axially extended cylindrically intermittent cams 247 individually poised clear of engagement of matching plurality of pawls 228 of pawl hub 221 with common inside cylindrical surface 248 slip fit to outer cylindrical periphery 226 of pawl hub 221. With reference to FIG. 22, cams 247 include individual recesses profiled at approximately 10 Degrees radially outwards at tangential engagement points of pawls 228 and provide the necessary cam action to collapse pawls 228 radially inwards upon relative circular motion in direction 22-1 depicted in FIG. 22 thereof. Radial support for pawl ratchet assembly 220 is provided by a set of bearings 249 slip fit into opposite counter bored cavities in cam hub 236.

With reference to FIGS. 23 & 24, rear wheel shaft 250 retained between bicycle frame right clevis 251 and left clevis 252 by locknuts 253 serves to support through said duplex set of bearings 249 pawl ratchet assembly 220 adjacent to but nested into ratchet hub 254 of rear hub assembly 13 also supported by rear wheel shaft 250 by means of a duplex set of bearings 255 separated by spacer 256.

With reference to FIGS. 24 & 26, actuation of pedals assembly 21 in the forward direction results in forward motion of chain 11 resulting in actuation of rear sprockets assembly 12 in the counterclockwise direction (FIG. 26—CCW) in turn rotationally driving pawl ratchet assembly 220 resulting in engagement of pawls 228 with ratchet hub 254 of rear hub 13 and thereby resulting in forward rotation of rear hub 13 and consequently rear bicycle wheel connected thereto by a plurality of spokes 257.

With reference to FIGS. 24 & 27, upon change in speed requiring shifting action combined with lack of actuation of pedals assembly 21 thereof, rider energizes chain driver 113 comprising chain driver motor 15 optionally equipped with roller clutch 258 serving to energize pinion 259 and gear 244, resulting in motion in the counterclockwise (FIG. 27—CCW) direction resulting in actuation of cam hub 236 forcing rotation of thereto retained pawl collapsing cup 233 forcing relative motion between cams 247 and predominantly stationary pawl hub 221 forcing inward collapse of pawls 228 continuing until full rotational travel of slots 232 of pawl cup 233 across pins 231 of pawl hub 221 is reached with further motion thereof forcing rotation of pawl hub 221 in the counterclockwise (FIG. 27—CCW) direction. Free from engagement of ratchet hub 254 and consequently rear hub 13, rotation of pawl hub 221 results in rotation of thereto retained rear sprockets assembly 12 and forward motion of chain 11 with slip action by pedals clutching mechanism 114 serving to sever power transmission to pedals assembly 21 thereby facilitating the necessary free motion of chain 11 in turn permitting shifting action by derailleurs 10 and 18.

Alternate Embodiment Pedals Clutching Mechanism—FIGS. 28-32.

With reference to FIGS. 28-32, the alternate embodiment of the pedals clutching mechanism 114 of the chain driver of the present invention made use of in manual derailleur based bicycle powertrain arrangement 101 comprises front sprockets assembly 20 including a plurality of sprockets 270 of different ratios rotationally retained to clutch hub 271 through sprocket internal splines 272 and matching external splines 273 of clutch hub 271, with sprockets 270 separated by spacers 274 and thereto radially supporting clutch hub 271 radially retained to pedals driveshaft 275 by a duplex set of bearings 276 disposed in counterbores in opposite ends of clutch hub 271 thereof. Pedals driveshaft 275 is radially retained to bicycle frame yoke 277 through angular contact bearings 278 and is rotationally keyed to right pedal 279 and left pedal 280 by means of keys 281, and is additionally rotationally retained by key 282 to roller hub 283 radially retaining a plurality of clutch rollers 284 spring loaded in the outward radial direction over forward incline profiled teeth 285 of roller hub 283 by a matching plurality of springs 286.

Figure 31:
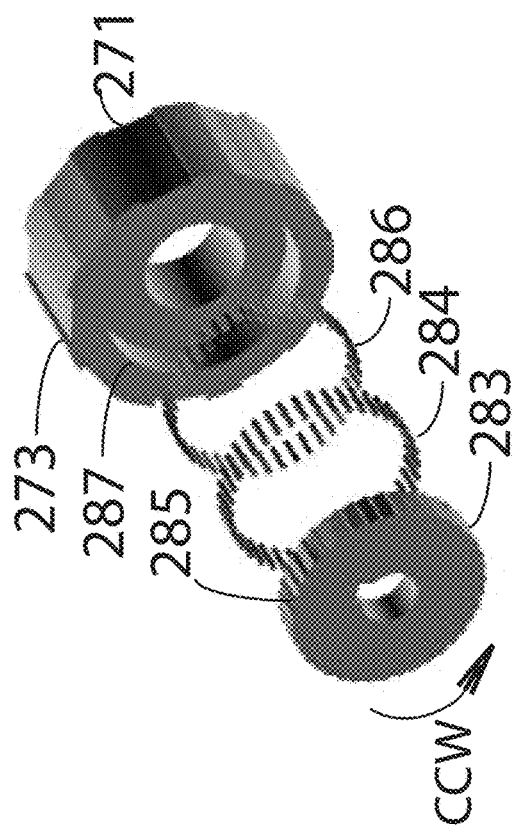
FIG. 31 is a perspective view of the pedals roller clutch assembly of the alternate embodiment of the chain driver of the present invention.

With reference to FIG. 31, roller hub 283 is centrally located internally to clutch hub 271 with plurality of clutch rollers 284 urged in the outward radial direction by said springs 286 over forward incline profiled teeth 285 of roller hub 283 thereby forcing wedging against mating smooth cylindrical profile 287 of clutch hub 271 and engagement thereof upon rotation of roller hub 283 in the counterclockwise (FIG. 31—CCW) direction and thereby ability to drive clutch hub 271 and thereto retained sprockets assembly 20 in the counterclockwise direction upon actuation of roller hub 283 by thereto keyed pedals 279 and 280 in the forward direction through driveshaft 275. Smooth cylindrical profile 287 of clutch hub 271 additionally provides for the necessary slip action upon rotation thereof in the counterclockwise (FIG. 31—CCW) direction with respect to roller hub 283 thereby the ability of clutch hub 271 to slip past roller hub 283 and thereto rotationally retained pedals 279 and 280, under forward rotation of sprockets assembly 20 due to forward motion of chain 11 upon actuation of alternate embodiment chain driver 113 of the present invention.

Figure 28:
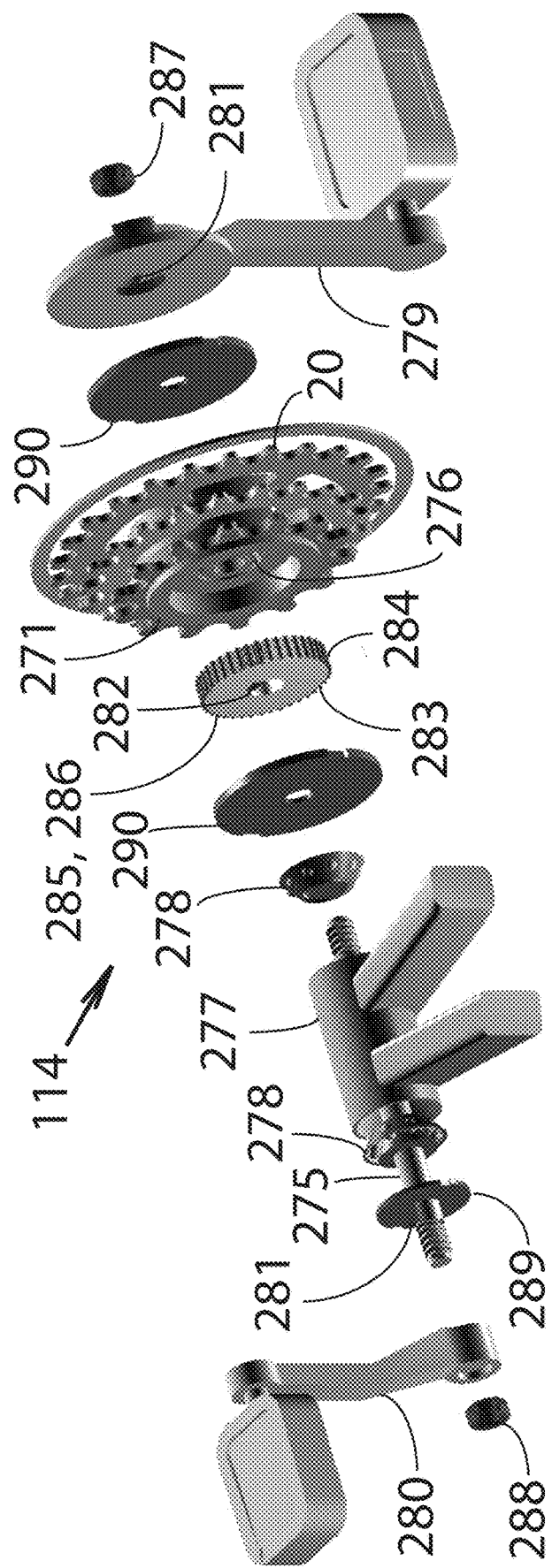
FIG. 28 is an exploded view of the pedals assembly of the alternate embodiment of the chain driver of the present invention.
Figure 30:
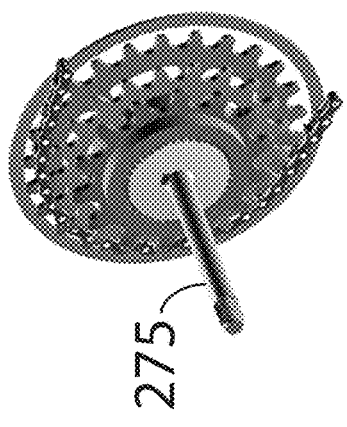
FIG. 30 is perspective view depicting internal construction of the pedals assembly of the alternate embodiment of the chain driver of the present invention.
Figure 29:
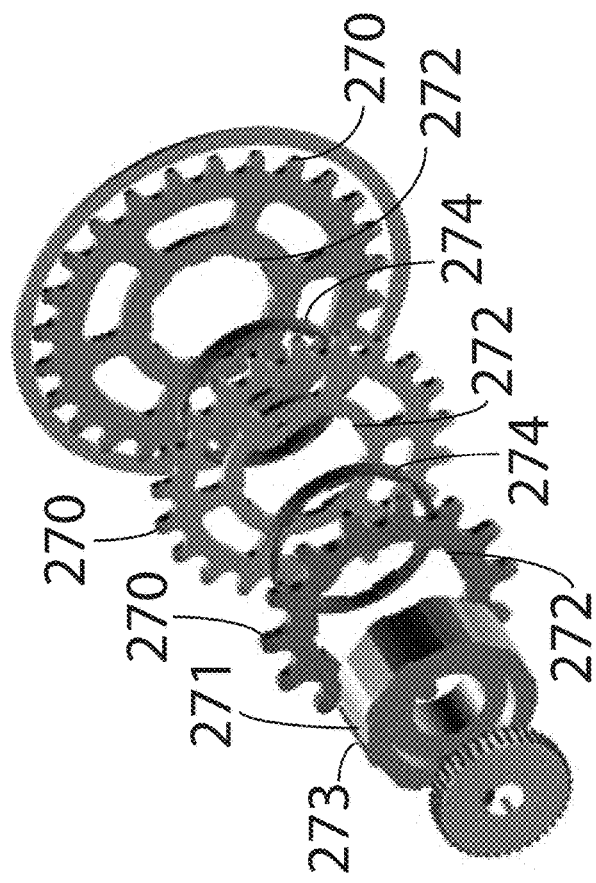
FIG. 29 is an exploded view of the pedals sprockets assembly of the alternate embodiment of the chain driver of the present invention.
Figure 32:
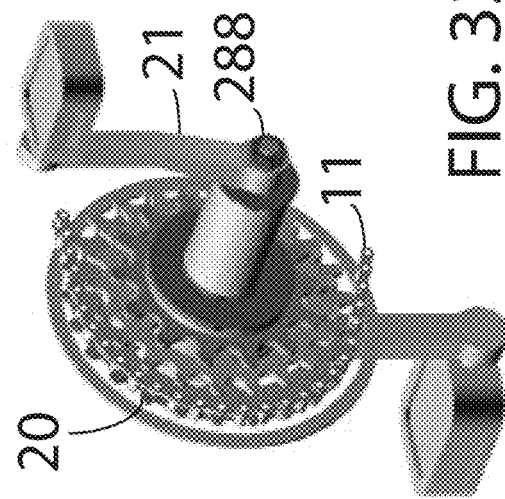
FIG. 32 is a perspective view of the pedals assembly of the alternate embodiment of the chain driver of the present invention.

As depicted in FIGS. 28, 30 & 32, pedals driveshaft 275 is secured in the axial direction by locknuts 288 serving to axially retain pedal 280 to spacer 289 to angular contact bearing 278 to bicycle frame yoke 277 on the left hand side and right pedal 279 against spacers 290 serving to axially retain roller hub 283 and clutch hub 271 as one integral clutching assembly retaining angular contact bearing 278 to bicycle frame yoke 277 on the right hand side. Actuation of the bicycle pedals 279 and 280 in the forward direction results in rotation of thereto keyed pedals driveshaft 275 in turn forcing rotation of thereto keyed roller hub 283 forcing radially outward spring loaded clutch rollers 284 to engage clutch hub 271 forcing rotation thereof and that of thereto retained front sprockets assembly 20 resulting in forward motion of chain 11 and power transmission to rear sprockets assembly 12. Conversely, forward movement of chain 11 under the action of alternate chain driver 113 while pedals assembly 21 is in a stationary state results in rotation of front sprockets assembly 20 and thereto rotationally retained clutch hub 271 causing slip over stationary roller hub 283 keyed to stationary pedals driveshaft 275 and thereto keyed pedals 279 and 280, and thereby facilitating free forward motion of chain 11 less power transmission thereof.

With reference to FIG. 32, pedals assembly 21 is depicted as an integral assembly comprising front sprockets assembly 20 and internal pedals clutching mechanism 114 with partial view in FIG. 30 depicting partial internal construction thereof.

Preferred and Alternate Chain Driver Options—FIG. 6.

With reference to FIG. 6, alternate embodiment chain driver 113 of the present invention is depicted along with preferred embodiment pedals ratcheting mechanism 112 to illustrate the available combinations of preferred and alternated embodiments chain driver and pedals ratcheting and clutching mechanisms. It is additionally noteworthy to indicate that another possible and workable combinations of disclosed chain drivers and pedals mechanisms include pairing preferred embodiment chain driver 111 with alternate embodiment pedals clutching mechanism 114.

The invention claimed is:
1. A bicycle derailleur chain driver apparatus comprising:
a) a bicycle rear wheel hub drive chain derailleur,
b) a bicycle drive chain in constant engagement with one of a plurality of a bicycle rear wheel sprockets,
c) a bicycle drive chain driver including an electric chain driver motor, a power disengagement means between said bicycle rear wheel hub sprockets and said bicycle rear wheel hub, and a forward actuation means of said bicycle drive chain,
d) a power pack for energizing said electric chain driver motor,
e) a chain driver power switch for actuating said electric chain driver motor, and
f) a bicycle pedals clutching apparatus fitted for actuation of said bicycle drive chain upon a forward pedaling motion and a slippage action thereof upon actuation of said electric chain driver motor with said bicycle pedals in a predominantly stationary state,
Whereby upon the need to operate said bicycle rear wheel hub drive chain derailleur along with an inability to alternate said bicycle pedals, a rider triggers said chain driver power switch thereby energizing said electric chain driver motor forcing disengagement of said bicycle rear wheel hub sprockets from said bicycle rear wheel hub and forward actuation thereof resulting in forward movement of said bicycle drive chain in turn enabling said rider to actuate said bicycle rear wheel hub drive chain derailleur with said bicycle pedals clutching apparatus providing said slippage action of said bicycle drive chain thereby circumventing power transmission thereof to said bicycle pedals, and thereby facilitating unconditional operation of said bicycle in an ergonomically acceptable fashion.

2. The bicycle derailleur chain driver apparatus of claim 1 including a second bicycle drive chain derailleur disposed at said bicycle pedals.

3. The bicycle derailleur chain driver apparatus of claim 1 wherein said bicycle pedals clutching apparatus includes a second pawl and ratchet mechanism.

4. The bicycle derailleur chain driver apparatus of claim 1 wherein said bicycle pedals clutching apparatus includes a roller clutch mechanism.

5. The bicycle derailleur chain driver apparatus of claim 1 wherein said electric chain driver motor includes a second roller clutch mechanism.

6. The bicycle derailleur chain driver apparatus of claim 1 wherein said power pack is trickle charged through a dynamo energized by motion of said bicycle.

7. A bicycle derailleur chain driver apparatus comprising:
a) a bicycle rear wheel hub drive chain derailleur,
b) a bicycle drive chain in constant engagement with one of a plurality of a bicycle rear wheel hub sprockets,
c) said bicycle rear wheel hub slaved to a pawl and ratchet assembly through attachment to a ratchet hub thereof embodying a plurality of ratchet pockets and internally housing a rotating pawl hub fitted with a corresponding plurality of pawls of predominantly circular midsections, urged in outward radial direction through a corresponding plurality of compression springs and adapted for engagement with said plurality of ratchet pockets, d) said rotating pawl hub including a radial extension retaining said plurality of pawls between a corresponding plurality of axial inner and outer gib extensions between mating concentric circular, peripheries thereof, including additional mating features limiting inward and outward radial movement of said plurality of pawls and embodying said corresponding plurality of compression springs, and an axial extension internal and rotationally secured to said bicycle rear wheel hub sprockets, e) said plurality of pawls further adapted for engagement with said plurality of ratchet pockets upon a forward actuation of a bicycle pedals, resultant forward movement of said bicycle drive chain and consequent forward rotation of said bicycle rear wheel hub sprockets, f) a bicycle drive chain driver apparatus including an electric chain driver motor, a thereto connected chain driver power transmission component with an affixed rotary connection to a power transmission cam hub slip fit to the inner periphery of said rotating pawl hub and including a radial extension embodying a plurality of cams serving to draw said plurality of pawls in the inward radial direction through a matching plurality of mating recessed features thereof, in turn forcing a corresponding rotation of said plurality of pawls, said rotating pawl hub, thereto retained said bicycle rear wheel hub sprockets and consequently forward motion of said bicycle drive chain upon said plurality of pawls reaching the end of their respective inward radial travel thereof, g) a bicycle pedals clutching apparatus fitted for actuation of said bicycle drive chain upon a forward pedaling motion and a slippage action thereof upon actuation of said electric chain driver motor with said bicycle pedals in a predominantly stationary state, h) a power pack for energizing said electric chain driver motor, and i) a chain driver power switch for actuating said electric chain driver motor, Whereby upon the need to operate said bicycle rear wheel hub drive chain derailleur along with an inability to alternate said bicycle pedals, a rider triggers said chain driver power switch thereby energizing said electric chain driver motor forcing rotation of said power transmission cam hub, collapse of said plurality of pawls, disengagement thereof to said bicycle rear wheel hub, rotation of said rotating pawl hub and thereto retained said bicycle rear wheel hub sprockets, forward movement of said bicycle drive chain in turn enabling said rider to actuate said bicycle rear wheel hub drive chain derailleur with said bicycle pedals clutching apparatus providing said slippage action of said bicycle drive chain thereby circumventing power transmission thereof to said bicycle pedals, and thereby facilitating unconditional operation of said bicycle in an ergonomically acceptable fashion.

8. The bicycle derailleur chain driver apparatus of claim 7 including a second bicycle drive chain derailleur disposed at said bicycle pedals.

9. The bicycle derailleur chain driver apparatus of claim 7 wherein said bicycle pedals clutching apparatus includes a second pawl and ratchet mechanism.

10. The bicycle derailleur chain driver apparatus of claim 7 wherein said bicycle pedals clutching apparatus includes a roller clutch mechanism.

11. The bicycle derailleur chain driver apparatus of claim 7 wherein said electrically powered chain driver motor includes a second roller clutch mechanism.

12. The bicycle derailleur chain driver apparatus of claim 7 wherein said chain driver power transmission component includes a gearset.

13. The bicycle derailleur chain driver apparatus of claim 7 wherein said chain driver power transmission component includes a timing belt and sprockets.

14. The bicycle derailleur chain driver apparatus of claim 7 wherein said power pack is trickle charged through a dynamo energized by motion of said bicycle.

15. A bicycle derailleur chain driver apparatus comprising:

a) a bicycle rear wheel hub drive chain, derailleur, b) a bicycle drive chain in constant engagement with one of a plurality of a bicycle rear wheel hub sprockets, c) said bicycle rear wheel hub slaved to a pawl and ratchet assembly through attachment to a ratchet hub thereof embodying a plurality of ratchet pockets and internally housing a rotating pawl hub fitted with a corresponding plurality of pivoting pawls urged in the outward radial direction through a corresponding plurality of springs and adapted for engagement with said plurality of ratchet pockets, d) said rotating pawl hub including a radial extension radially retaining said plurality of pivoting pawls and an axial extension internal and rotationally secured to said bicycle rear wheel hub sprockets, e) said plurality of pivoting pawls further adapted for engagement with said plurality of ratchet pockets upon a forward actuation of a bicycle pedals, resultant forward movement of said bicycle drive chain and consequent forward rotation of said bicycle rear wheel hub sprockets, f) a bicycle drive chain driver apparatus including an electric chain driver motor, a thereto connected power transmission gearset with an affixed rotary connection to a power transmission cam hub slip fit to the inner periphery of said rotating pawl hub and affixed on opposing end thereof to an enveloping cam cup detail embodying a plurality of intermittent cams corresponding to said plurality of pivoting pawls and fitted for urging collapse of said plurality of pivoting pawls in the inward radial direction through engagement with corresponding outer peripheries thereof upon actuation of said electric chain driver motor, g) said enveloping cam cup detail further embodying a plurality of circular slots slip fitting a corresponding plurality of slot pins press fit into said rotating pawl hub and limiting relative motion thereof with said plurality of slot pins further retaining hook ends of a matching plurality of extension springs urging disengagement of said plurality of intermittent cams with said plurality of pivoting pawls through retention of opposite hook ends thereof to a matching plurality of cam pins press fit into said enveloping cam cup detail, h) a bicycle pedals clutching apparatus fitted for actuation of said bicycle drive chain upon a forward pedaling motion and a slippage action thereof upon actuation of said electric chain driver motor with said bicycle pedals in a predominantly stationary state, i) a power pack for energizing said electric chain driver motor, and j) a chain driver power switch for actuating said electric chain driver motor, Whereby upon the need to operate said bicycle rear wheel hub drive chain derailleur along with an inability to alternate said bicycle pedals, a rider triggers said chain driver power switch thereby energizing said electric chain driver motor forcing rotation of said power transmission cam hub and thereto affixed said enveloping cam cup detail with said plurality of intermittent cams thereby forcing collapse of said plurality of pivoting pawls and disengagement thereof from said bicycle rear wheel hub with said plurality of circular slots of said enveloping cam cup detail subsequently bottoming out against said plurality of slot pins of said rotating pawl hub forcing rotation thereof along with thereto retained said bicycle rear wheel hub sprockets, forcing forward movement of said bicycle drive chain and in turn enabling said rider to actuate said bicycle rear wheel hub drive chain derailleur with said bicycle pedals clutching apparatus providing said slippage action of said bicycle drive chain thereby circumventing power transmission thereof to said bicycle pedals, and thereby facilitating unconditional operation of said bicycle in an ergonomically acceptable fashion.

16. The bicycle derailleur chain driver apparatus of claim 15 including a second bicycle drive chain derailleur disposed at said bicycle pedals.

17. The bicycle derailleur chain driver apparatus of claim 15 wherein said bicycle pedals clutching apparatus includes a second pawl and ratchet mechanism.

18. The bicycle derailleur chain driver apparatus of claim 15 wherein said bicycle pedals clutching apparatus includes a roller clutch mechanism.

19. The bicycle derailleur chain driver apparatus of claim 15 wherein said electric chain driver motor includes a second roller clutch mechanism.

20. The bicycle derailleur chain driver apparatus of claim 15 wherein said power pack is trickle charged through a dynamo energized by motion of said bicycle.

* * * * *